United States Patent
Yong et al.

(10) Patent No.: US 12,298,279 B1
(45) Date of Patent: May 13, 2025

(54) TESTING METHOD FOR LAYERED STRENGTH OF ROEBEL SINGLE-STRANDS

(71) Applicant: Lanzhou University, Lanzhou (CN)

(72) Inventors: Huadong Yong, Lanzhou (CN); Donghui Liu, Lanzhou (CN); Wanbo Wei, Lanzhou (CN); Jun Zhou, Lanzhou (CN)

(73) Assignee: LANZHOU UNIVERSITY, Lanzhou (CN)

( * ) Notice: Subject to any disclaimer, the term of this patent is extended or adjusted under 35 U.S.C. 154(b) by 0 days.

(21) Appl. No.: 18/970,949

(22) Filed: Dec. 6, 2024

(30) Foreign Application Priority Data

Aug. 21, 2024 (CN) .......................... 202411146644.1

(51) Int. Cl.
| | | |
|---|---|---|
| *G01N 3/18* | (2006.01) | |
| *G01N 1/28* | (2006.01) | |
| *G01N 3/04* | (2006.01) | |

(52) U.S. Cl.
CPC .............. *G01N 3/18* (2013.01); *G01N 1/286* (2013.01); *G01N 3/04* (2013.01); *G01N 2001/2886* (2013.01); *G01N 2203/0003* (2013.01); *G01N 2203/0017* (2013.01); *G01N 2203/0228* (2013.01); *G01N 2203/0282* (2013.01); *G01N 2203/04* (2013.01)

(58) Field of Classification Search
CPC ............ G01N 3/18; G01N 1/286; G01N 3/04; G01N 2001/2886; G01N 2203/0003; G01N 2203/0017; G01N 2203/0228; G01N 2203/0282; G01N 2203/04; G01N 3/08; G01N 19/04; G01N 29/04; G01N 29/2412; G01N 3/02; G01N 19/00; G01R 1/06; G01R 31/1263; G01R 33/1246; B23K 1/08; B23K 20/10; H01B 12/06; H01F 6/06; H01F 41/048
See application file for complete search history.

(56) References Cited

U.S. PATENT DOCUMENTS

| | | | | |
|---|---|---|---|---|
| 6,552,260 | B2 * | 4/2003 | Fujikami | H01B 12/00 |
| | | | | 505/231 |
| 2007/0298971 | A1 * | 12/2007 | Maher | H01F 41/048 |
| | | | | 505/100 |

FOREIGN PATENT DOCUMENTS

| | | | | |
|---|---|---|---|---|
| WO | WO-2016027522 A1 * | 2/2016 | | G01N 27/00 |
| WO | 2022116025 A1 | 6/2022 | | |

* cited by examiner

*Primary Examiner* — Brandi N Hopkins

(57) ABSTRACT

A testing method for layered strength of Roebel single-strands is provided, which relates to the field of material strength testing technologies. The testing method includes: preparing multiple Roebel single-strands as multiple testing samples; preparing multiple anvil heads, and welding the multiple anvil heads and the multiple testing samples in one-to-one correspondence to obtain multiple samples for anvil tensile testing; performing a tensile test on each sample for anvil tensile testing based on a set temperature and a set test position, and calculating peak load data of each sample for anvil tensile testing in the tensile test; calculating strength values of the multiple Roebel single-strands based on the peak load data of each sample for anvil tensile testing, and fitting the strength values based on a Weibull distribution function to obtain strength statistical characteristics; and calculating strength degradation data of each of the multiple Roebel single-strands based on the strength statistical characteristics.

7 Claims, 2 Drawing Sheets

TESTING METHOD FOR LAYERED STRENGTH OF ROEBEL SINGLE-STRANDS

CROSS-REFERENCE TO RELATED APPLICATION

This application claims priority to Chinese Patent Application No. 202411146644.1, filed on Aug. 21, 2024, which is herein incorporated by reference in its entirety.

TECHNICAL FIELD

The disclosure relates to the field of material strength testing technologies, and more particularly to a testing method for layered strength of Roebel single-strands.

BACKGROUND

Since the discovery of superconductivity, superconducting materials continue to expand boundaries of human cognition and possibility of using clean energy. Rare earth barium copper oxide (REBCO) tapes have become a leader of commercial superconducting materials due to their high critical temperature. In order to meet the needs of large current transmission, Roebel cables stacked with REBCO tapes came into being. The Roebel cables have advantages such as high current density and low alternating current (AC) loss, and have great potential in the fields of electricity, physics, and aerospace. The flexible design of the Roebel cables can adapt to different shape requirements, such as pancake or Rutherford structures, which shows the wide potential of the Roebel cables. However, related art faces the following several key shortcomings.

Firstly, a Roebel single-strand is susceptible to stress when operating in a liquid nitrogen temperature range, which results in layered damage and critical current degradation, but the layered strength at room temperature and the liquid nitrogen temperature is still unclear.

Secondly, the Roebel single-strand has complex transposition geometry and cutting state, which leads to challenges in sample preparation, position selection and representativeness in strength testing, and the testing method needs to take into account both applicability and efficiency.

Finally, in terms of data processing, there is a lack of statistically based methods to quantitatively describe the degradation of layered strength, making it impossible to accurately evaluate the performance and safety of the Roebel cables.

In summary, the related art for the research and evaluation of the layered strength of the Roebel cables is insufficient and needs to be further improved and optimized.

SUMMARY

A purpose of the disclosure is to provide a testing method for layered strength of Roebel single-strands to solve the above problems existed in the related art.

In order to achieve the above purpose, the disclosure provides a testing method for layered strength of Roebel single-strands, including:

step 1, preparing multiple Roebel single-strands as multiple testing samples;

step 2, preparing multiple anvil heads, and welding the multiple anvil heads and the multiple testing samples in one-to-one correspondence to obtain multiple samples for anvil tensile testing;

step 3, performing a tensile test on each of the multiple samples for anvil tensile testing based on a set temperature and a set test position, and calculating peak load data of each of the multiple samples for anvil tensile testing in the tensile test;

step 4, calculating strength values of the multiple Roebel single-strands based on the peak load data of each of the multiple samples for anvil tensile testing, and fitting the strength values based on a Weibull distribution function to obtain strength statistical characteristics; and step 5, calculating strength degradation data of each of the multiple Roebel single-strands based on the strength statistical characteristics.

In an exemplary embodiment, the testing method further includes: characterizing a degradation degree of the strength value of each of the multiple Roebel single-strands based on the strength degradation data of each of the multiple Roebel single-strands.

In an exemplary embodiment, the testing method further includes: improving a preparation method of the Roebel single-strand for a position of the Roebel single-strand with a most serious degradation based on the degradation degree of the strength value of each of the multiple Roebel single-strands, to obtain an improved Roebel single-strand. The improved Roebel single-strand may be tested by the testing method for layered strength of Roebel single-strands to determine whether the degradation degree of the strength value of the Roebel single-strand at the sane position is improved. Therefore, the testing method helps to verify the effectiveness of the preparation method of the Roebel single-strand.

In an exemplary embodiment, the testing method further includes: applying the degradation degree of the strength value of each of the multiple Roebel single-strands to rapidly estimate a strength value of a Roebel single-strand prepared by using a REBCO superconducting tape of other manufacturers. Thus, the testing method can save manpower or time costs for repeated testing.

In an exemplary embodiment, the testing method further includes: performing a finite element analysis on the Roebel single-strands by using the strength degradation data of each of the multiple Roebel single-strands as an input parameter to assist in strength verification, to thereby simply a design process.

In an embodiment, the step 1 specifically includes:
obtaining a REBCO superconducting tape, and cutting the REBCO superconducting tape based on preset sample geometric data using a laser marking machine to obtain the multiple Roebel single-strands as the testing samples.

In an embodiment, the step 2 specifically includes:
S1, preparing an upper anvil head and a lower anvil head;
S2, welding the upper anvil and the lower anvil head to a corresponding one of the multiple testing samples based on preset welding positions; and
S3, performing steps S1 and S2 repeatedly until the multiple samples for anvil tensile testing with a preset numbers are prepared.

In an embodiment, the upper anvil and the lower anvil are prepared by using oxygen free copper.

In an embodiment, a width of the upper anvil head is the same as a width of a corresponding position of the corresponding one of the multiple testing samples; and a length and a width of the lower anvil head are not smaller than a length and the width of the upper anvil head respectively.

In an embodiment, the welding the upper anvil and the lower anvil head to a corresponding one of the multiple testing samples based on preset welding positions, specifically includes:

polishing, cleaning and soldering contact surfaces of the upper anvil head and the lower anvil head with the corresponding one of the multiple testing samples in sequence to obtain an initial sample; and placing the initial sample on a heating stage to heat the initial sample to thereby obtain a heated sample, and removing excess solder from the heated sample to obtain one sample for anvil tensile testing of the multiple samples for anvil tensile testing.

In an embodiment, the calculating peak load data of each of the multiple samples for anvil tensile testing in the tensile test, specifically includes:

recording a load-displacement curve corresponding to each of the multiple samples for anvil tensile testing in the tensile test until the samples for anvil tensile testing is damaged, and calculating the peak load data of each of the multiple samples for anvil tensile testing based on the load-displacement curve corresponding to each of the multiple samples for anvil tensile testing.

In an embodiment, a specific calculation formula for calculating the strength values of the multiple Roebel single-strands based on the peak load data of each of the multiple samples for anvil tensile testing is as follows:

$$\sigma = \frac{F_{max}}{s};$$

where σ represents the strength value, S represents a welding area, and $F_{max}$ represents the peak load data.

In an embodiment, specific calculation formulas for fitting the strength values based on the Weibull distribution function are expressed as follows:

$$F(\sigma) = 1 - \exp\left[-\left(\frac{\sigma - \gamma}{\alpha}\right)^{\beta}\right];$$
$$R(\sigma) = 1 - F(\sigma);$$

where F(σ) represents the Weibull distribution function, α represents a scale parameter, β represents a shape parameter, γ represents a position parameter, exp represents a natural exponential function, and R(σ) represents a reliability function.

In an embodiment, the step 5 specifically includes:

calculating the strength degradation data of each of the multiple Roebel single-strands under different temperatures and different positions based on a relative error formula and the strength statistical characteristics.

Technical effects of the disclosure are as follows.

The disclosure provides a testing technology of layered strength for a high-temperature superconducting Roebel single-strand with simple steps and strong applicability, and a method for quantitatively describing the strength degradation degree based on testing data. The disclosure has high experimental efficiency, and multiple groups of samples for anvil tensile testing can be prepared at the same time as needed, and experiments can be carried out in parallel to save time cost. The data processing of the disclosure is based on Weibull statistics and introduces a reliability evaluation system, which provides a more practical reference basis for engineers. The testing technical solution of the embodiment can provide a basic parameter indicator for the industrial application of a high-temperature superconducting Roebel cable structure, and guide the optimal design of the structure.

BRIEF DESCRIPTION OF DRAWINGS

In order to describe the technical solutions in embodiments of the disclosure or related art more clearly, drawings required in the embodiments will be simply introduced below. Apparently, the drawings in the following descriptions are merely some of the embodiments of the disclosure. For those skilled in the art, other drawings can be obtained according to these drawings without creative work.

The drawings constituting a part of the disclosure are used to provide a further understanding of the disclosure. The illustrative embodiments and descriptions of the disclosure are used to describe the disclosure and do not constitute an improper limitation on the disclosure.

DETAILED DESCRIPTION OF EMBODIMENTS

Various exemplary embodiments of the disclosure will now be described in detail. The detailed description should not be considered as limiting the disclosure, but should be understood as a more detailed description of certain aspects, features, and embodiments of the disclosure.

It should be understood that the terms described in the disclosure are only for describing a particular embodiment and are not intended to limit the disclosure. In addition, for the numerical range in the disclosure, it should be understood that each intermediate value between the upper and lower limits of the scope is also specifically disclosed. Each smaller range between the intermediate value in any stated value or stated range and any other stated value or intermediate value in the described range is also included in the disclosure. The upper and lower limits of these smaller ranges can be independently included or excluded in the scope.

Unless otherwise indicated, all technical and scientific terms used herein have the same meanings as those skilled in the art generally understood by the disclosure. Although the disclosure describes only some methods, any method similar or equivalent to that described herein may also be used in the implementation or testing of the disclosure. All documents mentioned in this specification are incorporated by reference to disclose and describe the methods related to the documents. In the event of a conflict with any incorporated document, the content of this specification shall prevail.

It will be obvious to those skilled in the art that various modifications and variations may be made to the specific embodiments of the disclosure description without departing from the scope or spirit of the disclosure. Other embodiments derived from the disclosure description will be obvious to those skilled in the art. The disclosure description and embodiments are exemplary only.

The words "include," "including," "have," and "contain," used in the disclosure are open-ended terms, meaning including but not limited to.

It should be noted that, in the absence of conflict, the embodiments in the disclosure and the features in the embodiments can be combined with each other. The disclosure will be described in detail below with reference to the drawings and in combination with the embodiments.

Embodiment 1

Figure 1:
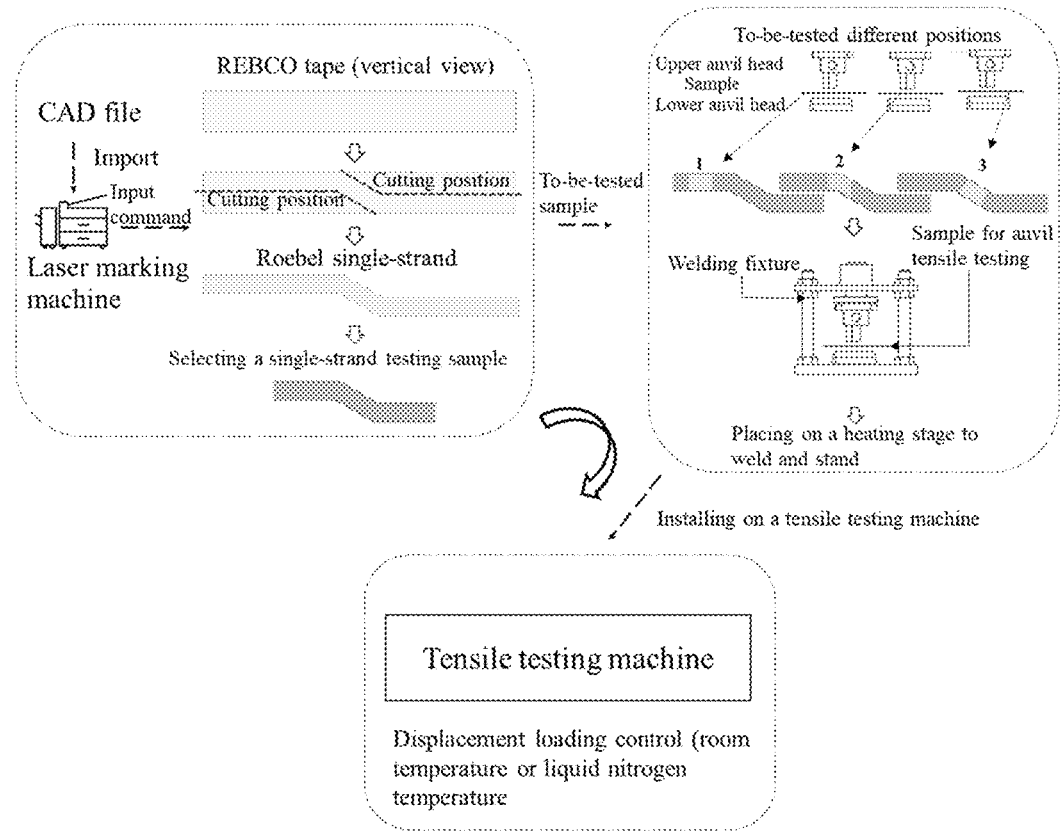
FIG. 1 illustrates a schematic diagram of core steps of a testing scheme according to an embodiment of the disclosure.
Figure 2:
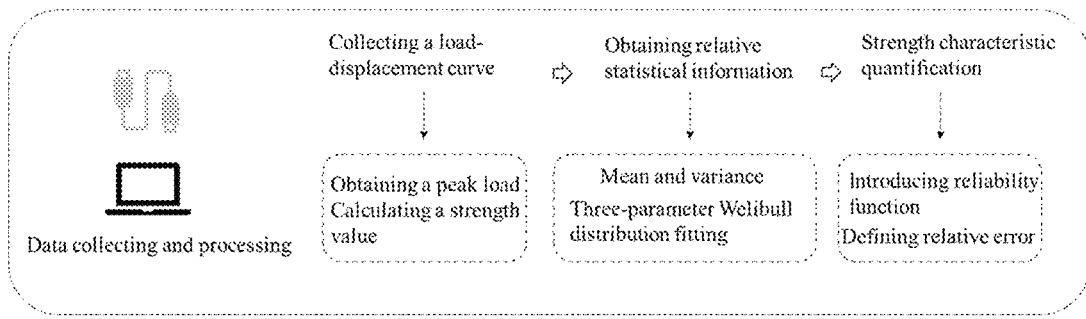
FIG. 2 illustrates a schematic diagram of core steps of data collecting and processing according to an embodiment of the disclosure.
Figure 3:
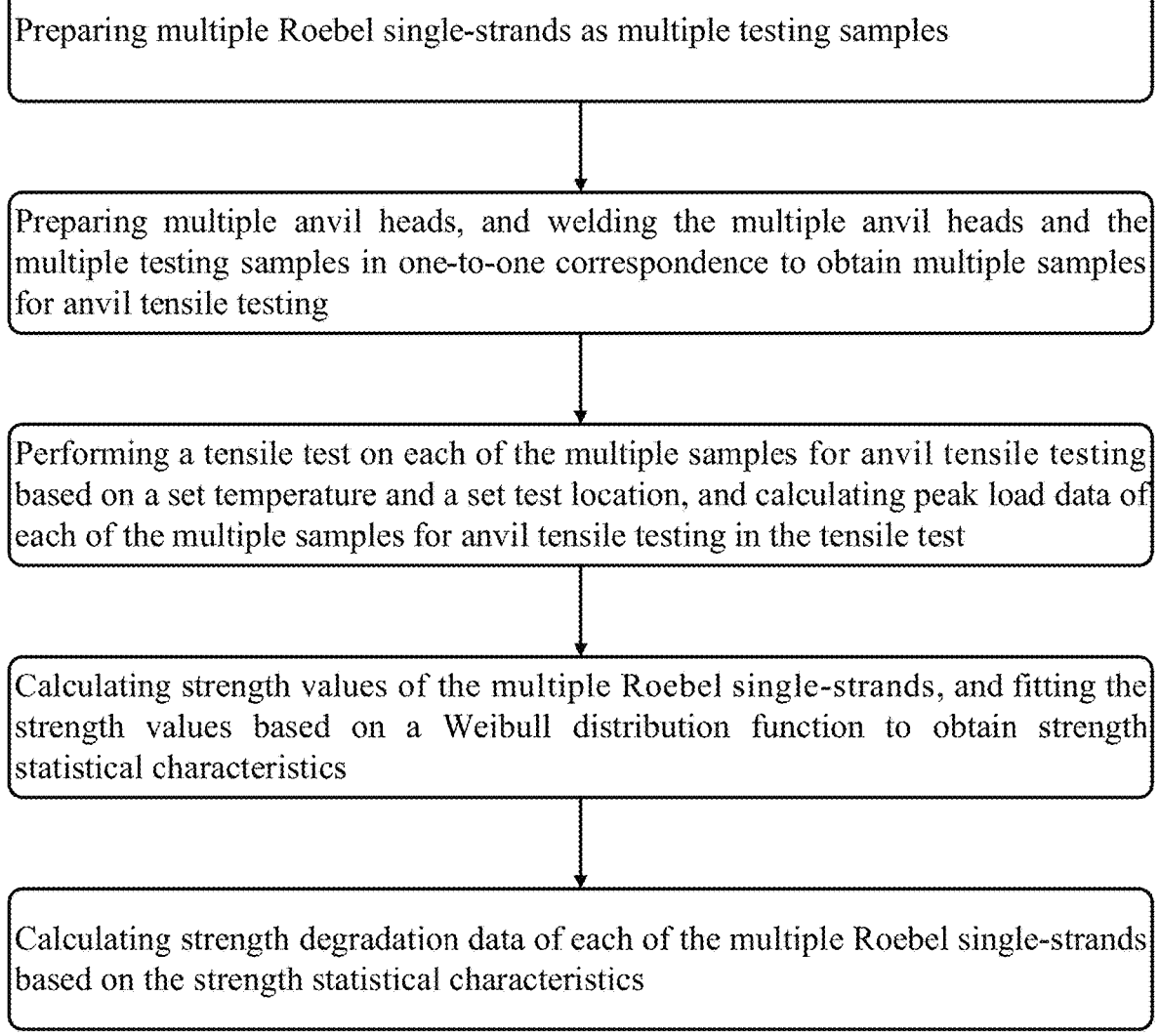
FIG. 3 illustrates a flowchart of a testing for layered strength of Roebel single-strand according to an embodiment of the disclosure.

As shown in FIGS. 1-3, the embodiment provides a testing method for layered strength of Roebel single-strands, including the following steps. Multiple Roebel single-strands are prepared as multiple testing samples. Multiple anvil heads are prepared, and the multiple anvil heads and the multiple testing samples are welded in one-to-one correspondence to obtain multiple samples for anvil tensile testing. A tensile test is performed on each of the multiple samples for anvil tensile testing based on a set temperature and a set test position, and peak load data of each of the multiple samples for anvil tensile testing are calculated in the tensile test. Strength values of the multiple Roebel single-strands are calculated based on the peak load data of each of the multiple samples for anvil tensile testing, and the strength values are fitted based on a Weibull distribution function to obtain strength statistical characteristics. Strength degradation data of each of the multiple Roebel single-strands is calculated based on the strength statistical characteristics.

The embodiment provides a testing technology of layered strength for a high-temperature superconducting Roebel single-strand with simple steps and strong applicability, and a method for quantitatively describing the strength degradation degree based on testing data. The preparation process of the Roebel single-strand testing samples is easy to implement, and the preparation process is suitable for commercial superconducting tapes of different sizes. The raw materials of the anvil heads are environmentally friendly and easy to obtain, and the anvil heads can be used repeatedly at different temperatures.

The testing method of the embodiment has high experimental efficiency, and multiple groups of samples for anvil tensile testing can be prepared at the same time as needed, and experiments can be carried out in parallel to save time cost. The data processing of the disclosure is based on Weibull statistics and introduces a reliability evaluation system, which provides a more practical reference basis for engineers. The testing technical solution of the embodiment can provide a basic parameter indicator for the industrial application of a high-temperature superconducting Roebel cable structure, and guide the optimal design of the structure.

A specific implementation process of the embodiment is as follows.

In step 1, a Roebel single-strand is prepared as a testing sample. A REBCO superconducting tape with a width of 12 millimeters (mm) is selected, a sample geometric file pre-drawn in a CAD® software is imported into a laser marking machine (e.g., an excimer laser and a picosecond laser), and then the REBCO superconducting tape is cut at the room temperature by laser to obtain a narrow strand (i.e., the testing sample) having transposition characteristics with a width of 2 mm to 6 mm and a length of 5 centimeters (cm) to 8 cm.

In step 2, an upper anvil head and a lower anvil head are prepared. The anvil heads are prepared by oxygen free copper, a width of the upper anvil head should be determined according to a width of a corresponding position of the narrow strand, a length and a width of the lower anvil head are not smaller than a length and the width of the upper anvil head respectively, and a lower surface of the upper anvil head should be consistent with the sample geometry.

In step 3, a sample for anvil tensile testing is prepared. Surfaces of the anvil heads (i.e., the upper anvil head and the lower anvil head) contacting with to-be-welded surfaces of the narrow strand are polished (300-400 mesh), and then the surfaces of the narrow strand and the surfaces of the anvil heads are cleaned with anhydrous ethanol or acetone. Solder is evenly coated on the lower surface of the upper anvil head, the upper and lower surfaces of the narrow strand and the upper surface of the lower anvil head, and the upper anvil head, the narrow strand and the lower anvil head are fixed according to relative positions, and are installed on a welding fixture after removing excess solder. Components of the solder is tin (Sn) 96.5/silver (Ag) 3.0/copper (Cu) 0.5, and a melting point of the solder is about 217 Celsius degrees (° C.).

In step 4, the welding fixture with the upper anvil head, the narrow strand and the lower anvil head is placed on a heating stage. When the temperature rises to 217° C. to 227° C., the excess solder effused from the welding fixture is removed to prevent the upper anvil head and the lower anvil head from welding together, and the sample for anvil tensile testing is obtained.

In step 5, the heating stage is closed, and the welding fixture with the sample for anvil tensile testing is stood, and cooled naturally to the room temperature (about 3 hours abbreviated as h to 4 h).

In step 6, an experiment test (i.e., tensile test) is performed on the sample for anvil tensile testing. The sample that has been welded and cooled to the room temperature is removed from the welding fixture, and installed on a fixture of a tensile testing machine. The test is carried out at the room temperature environment or a liquid nitrogen temperature range, displacement loading control is adopted, and a speed for the tensile test is 0.1 milliliter per minute (mm/min). A load-displacement curve is collected during the tensile test until the sample is destroyed, and a peak load is recorded and stored. The sample is removed from the tensile testing machine after destroying, and a morphological characteristic of a fracture surface of the samples is observed.

In step 7, the strength test (i.e., the tensile test) is performed on no less than 30 testing samples at different positions of the Roebel single-strands. The specific process of the strength test is shown in FIG. 1. The strength test is repeated several times according to the details described in the step 6.

In step 8, the layered strength data is processed. As shown in FIG. 2, peak load data $F_{max}$ of each test is obtained from a collected experimental dataset, and a corresponding strength value $\sigma$ is calculated according to a formula of $$\sigma = \frac{F_{max}}{s},$$

where S represents a welding area. A mean and a variance of the strength values at room temperature and 77 Kelvin degrees (K) (i.e., the liquid nitrogen temperature) are calculated for all testing samples, and the strength values are fitted by using a Weibull distribution to determine the strength statistical characteristics under different situations. A cumulative distribution function of a three-parameter Weibull distribution is:

$$F(\sigma) = 1 - \exp\left[-\left(\frac{\sigma - \gamma}{\alpha}\right)^\beta\right],$$

where $F(\sigma)$ represents the Weibull distribution function, $\alpha$ represents a scale parameter, $\beta$ represents a shape parameter, $\gamma$ represents a position parameter, exp represents a natural exponential function. The three parameters can be uniquely determined according to the experimental results under the same conditions. Specifically, the position parameter $\gamma$ should be determined first, then the scale parameter $\alpha$ and the shape parameter $\beta$ are determined by linear regression analysis. For example, the position parameter $\gamma$, the the scale parameter $\alpha$ and the shape parameter $\beta$ can be determined by using a maximum likelihood estimation (MLE), a least squares method, or a graphical method. A reliability function $R(\sigma)=1-F(\sigma)$ is introduced after fitting, and the reliability functions under different conditions are drawn.

In step 9, strength degradation degrees of the Roebel single-strands relative to the uncut trap under different testing temperatures and different positions are calculated based on the strength statistical characteristics, to determine positions in the Roebel single-strand that are more prone to damage, and obtain strength degradation degrees under different reliability levels. The strength degradation degrees are described by a defined relative error as follows:

$$\text{Degradation (Temperature)} = \frac{\sigma(RT, \text{case}) - \sigma(77\text{ K, case})}{\sigma(RT, \text{case})}; \quad (1)$$

$$\text{Degradation }(RT, \text{Cutting}) = \frac{\sigma(RT, \text{Uncut}) - \sigma(RT, \text{case})}{\sigma(RT, \text{Uncut})}; \quad (2)$$

$$\text{Degradation }(77\text{ K, Cutting}) = \frac{\sigma(77\text{ K, Uncut}) - \sigma(77\text{ K, case})}{\sigma(77\text{ K, Uncut})} \quad (3)$$

$$\text{Degradation (Temperature \& Cutting)} = \quad (4)$$
$$\frac{\sigma(RT, \text{Uncut}) - \sigma(77\text{ K, case})}{\sigma(RT, \text{Uncut})};$$

where case represents a cutting state, Uncut represents an uncut REBCO superconducting tape, RT represents a room temperature, Cutting represents that a corresponding degradation degree is related to a cutting state of the REBCO superconducting tape, Temperature represents that a corresponding degradation degree is related to a temperature change factor; Degradation( ) represents a degradation degree of the strength value of the Roebel single-strand, $\sigma(\ )$ represents a strength value in a temperature and cutting state; the formula (1) represents a degradation degree of the strength value of the Roebel single-strand under 77 K relative to the strength value of the Roebel single-strand under the room temperature, the formula (2) represents a degradation degree of the strength value of the Roebel single-strand under the room temperature relative to the strength value of the uncut REBCO superconducting tape under the room temperature, the formula (3) represents a degradation degree of the strength value of the Roebel single-strand under the 77 K relative to the strength value of the uncut REBCO superconducting tape under the 77 K, and the formula (4) represents a degradation degree of the strength value of the Roebel single-strand under the 77 K relative to the strength value of the uncut REBCO superconducting tape under the room temperature. Degradation (Temperature) represents the degradation degree of the strength value of the Roebel single-strand caused by the temperature, Degradation (RT, Cutting) represents the degradation degree of the strength value of the Roebel single-strand caused by cutting state of the tape at the room temperature, Degradation (77K, Cutting) represents the degradation degree of the strength value of the Roebel single-strand caused by cutting state of the tape at 77 K, and Degradation (Temperature & Cutting) represents the degradation degree of the strength value of the Roebel single-strand caused by temperature and the cutting state of the tape. The significance of obtaining the strength degradation degrees is that the conclusion of this experiment can be appropriately extended to the Roebel single-strands prepared by other manufacturers using the same process. Under the same reliability, the corresponding strength value is substituted into the above relative error formulas to evaluate the strength degradation degree of the Roebel single-strand.

The above is only an embodiment of the disclosure, but the protection scope of the disclosure is not limited thereto. Any changes or substitutions that can be easily thought of by those skilled in the art within the technical scope disclosed in the disclosure should be included in the protection scope of the disclosure. Therefore, the protection scope of the disclosure should be based on the protection scope of the claims.

What is claimed is:

1. A testing method for layered strength of Roebel single-strands, comprising:
   step 1, obtaining a rare earth barium copper oxide (REBCO) superconducting tape, and cutting the REBCO superconducting tape based on preset sample geometric data using a laser marking machine to obtain multiple Roebel single-strands as multiple testing samples;
   step 2, preparing multiple anvil heads, and welding the multiple anvil heads and the multiple testing samples in one-to-one correspondence to obtain multiple samples for anvil tensile testing;
   step 3, performing a tensile test on each of the multiple samples for anvil tensile testing based on a set temperature and a set testing position, and calculating peak load data of each of the multiple samples for anvil tensile testing in the tensile test;
   step 4, calculating strength values of the multiple Roebel single-strands based on the peak load data of each of the multiple samples for anvil tensile testing, and fitting the strength values based on a Weibull distribution function to obtain strength statistical characteristics; and
   wherein specific calculation formulas for fitting the strength values based on the Weibull distribution function are expressed as follows:

$$F(\sigma) = 1 - \exp\left[-\left(\frac{\sigma - \gamma}{\alpha}\right)^\beta\right];$$
$$R(\sigma) = 1 - F(\sigma);$$

where $F(\sigma)$ represents the Weibull distribution function, $\alpha$ represents a scale parameter, $\beta$ represents a shape parameter, $\gamma$ represents a position parameter, exp represents a natural exponential function, $\sigma$ represents the strength value of each of the multiple Roebel single-strands, and R(σ) represents a reliability function;

step 5, calculating strength degradation data of each of the multiple Roebel single-strands under different temperatures and different positions based on a relative error formula and the strength statistical characteristics; wherein specific calculation formulas (1)-(4) are expressed as follows:

$$\text{Degradation (Temperature)} = \frac{\sigma(RT, \text{case}) - \sigma(77\ K, \text{case})}{\sigma(RT, \text{case})}; \quad (1)$$

$$\text{Degradation } (RT, \text{Cutting}) = \frac{\sigma(RT, \text{Uncut}) - \sigma(RT, \text{case})}{\sigma(RT, \text{Uncut})}; \quad (2)$$

$$\text{Degradation } (77\ K, \text{Cutting}) = \frac{\sigma(77\ K, \text{Uncut}) - \sigma(77\ K, \text{case})}{\sigma(77\ K, \text{Uncut})} \quad (3)$$

$$\text{Degradation (Temperature \& Cutting)} = \quad (4)$$
$$\frac{\sigma(RT, \text{Uncut}) - \sigma(77\ K, \text{case})}{\sigma(RT, \text{Uncut})};$$

wherein case represents a cutting state, Uncut represents an uncut REBCO superconducting tape, RT represents a room temperature, Cutting represents that a corresponding degradation degree is related to the cutting state of the REBCO superconducting tape, Temperature represents that a corresponding degradation degree is related to a temperature change factor; Degradation( ) represents a degradation degree of the strength value of the Roebel single-strand, σ( ) represents a strength value in a temperature and a cutting state; the formula (1) represents a degradation degree of the strength value of the Roebel single-strand under 77 Kelvin degrees (K) relative to the strength value of the Roebel single-strand under the room temperature, the formula (2) represents a degradation degree of the strength value of the Roebel single-strand under the room temperature relative to the strength value of the uncut REBCO superconducting tape under the room temperature, the formula (3) represents a degradation degree of the strength value of the Roebel single-strand under the 77 K relative to the strength value of the uncut REBCO superconducting tape under the 77 K, and the formula (4) represents a degradation degree of the strength value of the Roebel single-strand under the 77 K relative to the strength value of the uncut REBCO superconducting tape under the room temperature.

2. The Testing method for layered strength of the Roebel single-strands as claimed in claim 1, wherein the step 2 specifically comprises:

S1, preparing an upper anvil head and a lower anvil head;
S2, welding the upper anvil and the lower anvil head to a corresponding one of the multiple testing samples based on preset welding positions; and S3, performing steps S1 and S2 repeatedly until the multiple samples for anvil tensile testing with a preset numbers are prepared.

3. The Testing method for layered strength of the Roebel single-strands as claimed in claim 2, wherein the upper anvil and the lower anvil are prepared by using oxygen free copper.

4. The Testing method for layered strength of the Roebel single-strands as claimed in claim 2, wherein a width of the upper anvil head is the same as a width of a corresponding position of the corresponding one of the multiple testing samples; and a length and a width of the lower anvil head are not smaller than a length and the width of the upper anvil head respectively.

5. The Testing method for layered strength of the Roebel single-strands as claimed in claim 2, wherein the welding the upper anvil and the lower anvil head to a corresponding one of the multiple testing samples based on preset welding positions, specifically comprises:

polishing, cleaning and soldering contact surfaces of the upper anvil head and the lower anvil head with the corresponding one of the multiple testing samples in sequence to obtain an initial sample; and placing the initial sample on a heating stage to heat initial sample to thereby obtain a heated sample, and removing excess solder from the heated sample to obtain one sample for anvil tensile testing of the multiple samples for anvil tensile testing.

6. The Testing method for layered strength of the Roebel single-strands as claimed in claim 1, wherein the calculating peak load data of each of the multiple samples for anvil tensile testing in the tensile test, specifically comprises:

recording a load-displacement curve corresponding to each of the multiple samples for anvil tensile testing in the tensile test until the sample for anvil tensile testing is destroyed, and calculating the peak load data of each of the multiple samples for anvil tensile testing based on the load-displacement curve corresponding to each of the multiple samples for anvil tensile testing.

7. The Testing method for layered strength of the Roebel single-strands as claimed in claim 1, wherein a specific calculation formula for calculating the strength values of the multiple Roebel single-strands based on the peak load data of each of the multiple samples for anvil tensile testing is as follows:

$$\sigma = \frac{F_{max}}{s};$$

wherein S represents a welding area, and $F_{max}$ represents the peak load data.

* * * * *